United States Patent [19]

Norkus, Jr.

[11] 4,392,682
[45] Jul. 12, 1983

[54] EXPANSIBLE AND RETRACTABLE VEHICLE BODY

[76] Inventor: Kasper Norkus, Jr., 10930 S. Harlem Ave., Worth, Ill. 60482

[21] Appl. No.: 289,883

[22] Filed: Aug. 4, 1981

[51] Int. Cl.³ .................................................. B62D 33/08
[52] U.S. Cl. ......................................... 296/26; 296/181
[58] Field of Search ....................... 296/26, 27, 181, 183

[56] References Cited

U.S. PATENT DOCUMENTS

| | | | |
|---|---|---|---|
| 2,797,124 | 6/1957 | Hauptli | 296/181 |
| 3,140,116 | 7/1964 | Speas | 296/26 |
| 3,286,414 | 11/1966 | Harrison | 296/26 |
| 3,519,306 | 7/1970 | Young | 296/27 |
| 3,622,193 | 11/1971 | Schmidt | 296/164 |
| 3,674,305 | 7/1972 | Steury | 296/27 |
| 3,694,024 | 9/1972 | Linville | 296/26 |
| 4,094,546 | 6/1978 | Glassmeyer | 296/183 |
| 4,103,958 | 8/1978 | Parent | 296/26 |
| 4,206,943 | 6/1980 | Friedenberg | 296/26 |

*Primary Examiner*—Joseph F. Peters, Jr.
*Assistant Examiner*—John A. Carroll

*Attorney, Agent, or Firm*—Hill, Van Santen, Steadman, Chiara & Simpson

[57] ABSTRACT

A cargo truck trailer has telescoped box-like top and bottom body portions with mechanism operated from a single control station which will raise and lower the top body portion to provide maximum cargo space that will clear overhead structures such as viaducts along the intended travel route so that a single vehicle trailer becomes useful at maximum capacity over a designated route. The top or roof body portion is guided by ribs or struts of the bottom body portion. The mechanism which raises and lowers the top body portion is housed within the bottom body portion preferably between its outer skin and inner liner. The control station is a single crank which drives gears and chains to simultaneously rotate a plurality of vertical screw rods at the corners and midsection of the body to raise and lower nut members carried by the top body portion. An access door or tailgate is supported on telescoped tracks which accommodate the raising and lowering of the top body or roof portion so that the cargo section may be completely closed regardless of its selected height.

15 Claims, 8 Drawing Figures

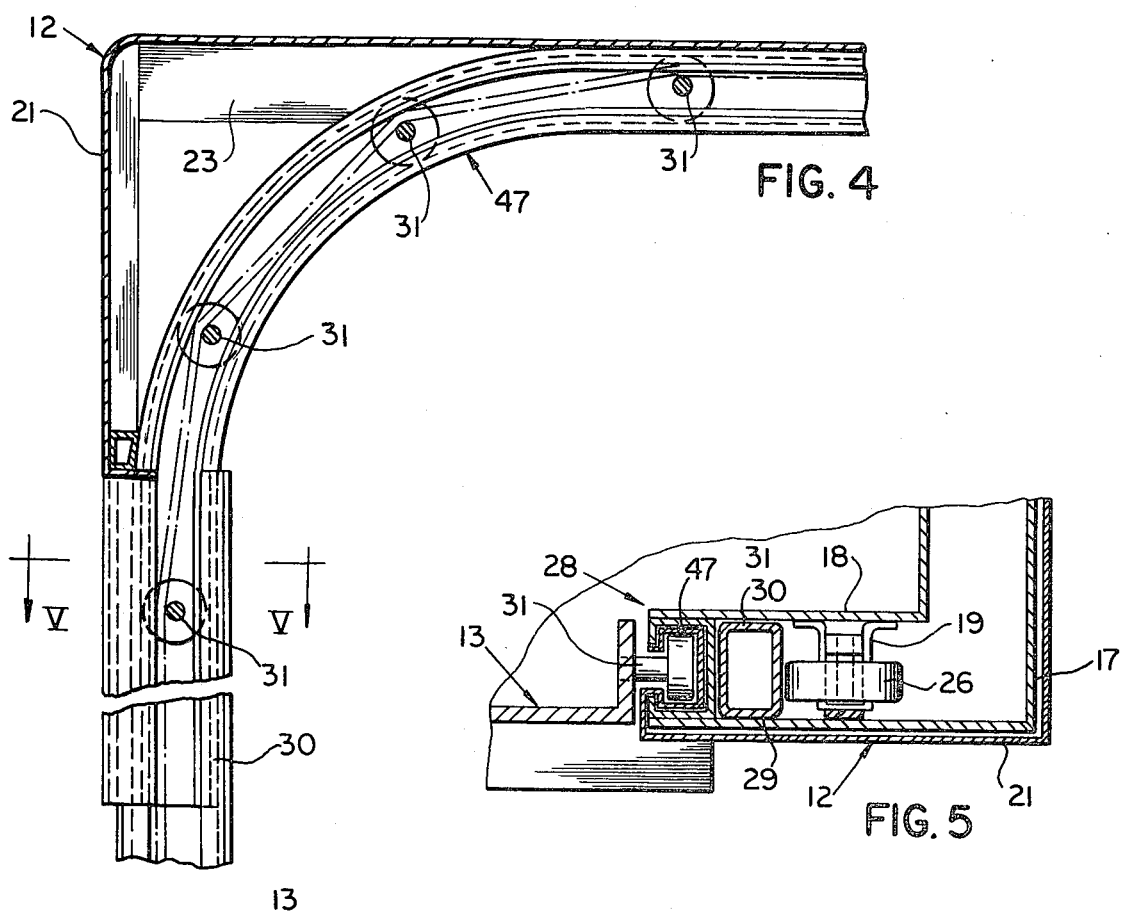
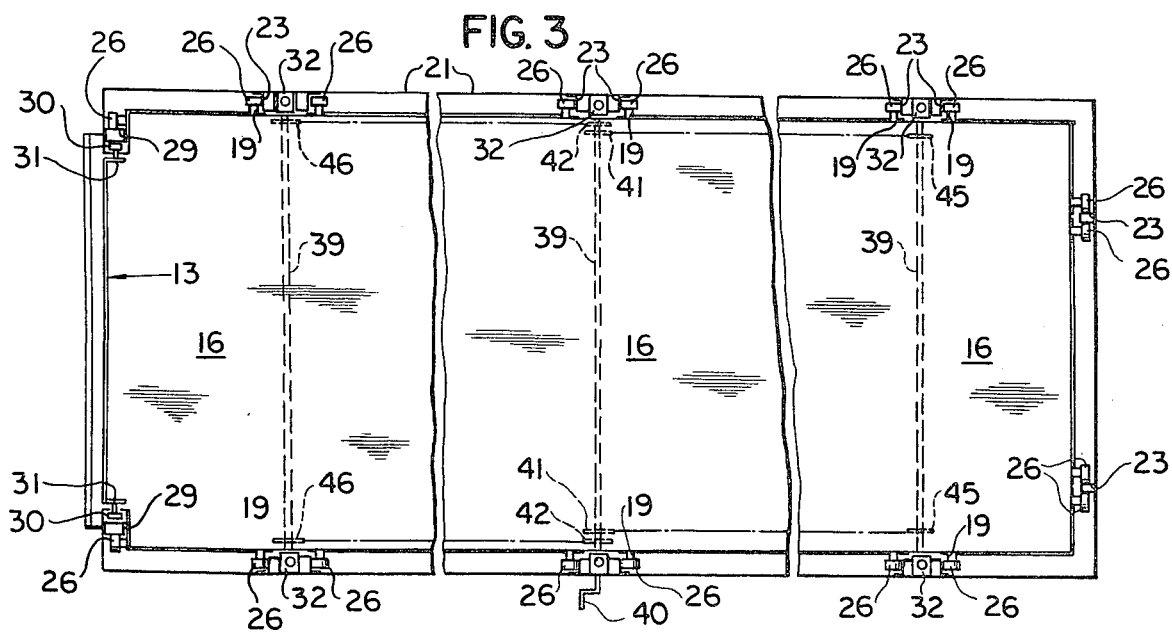

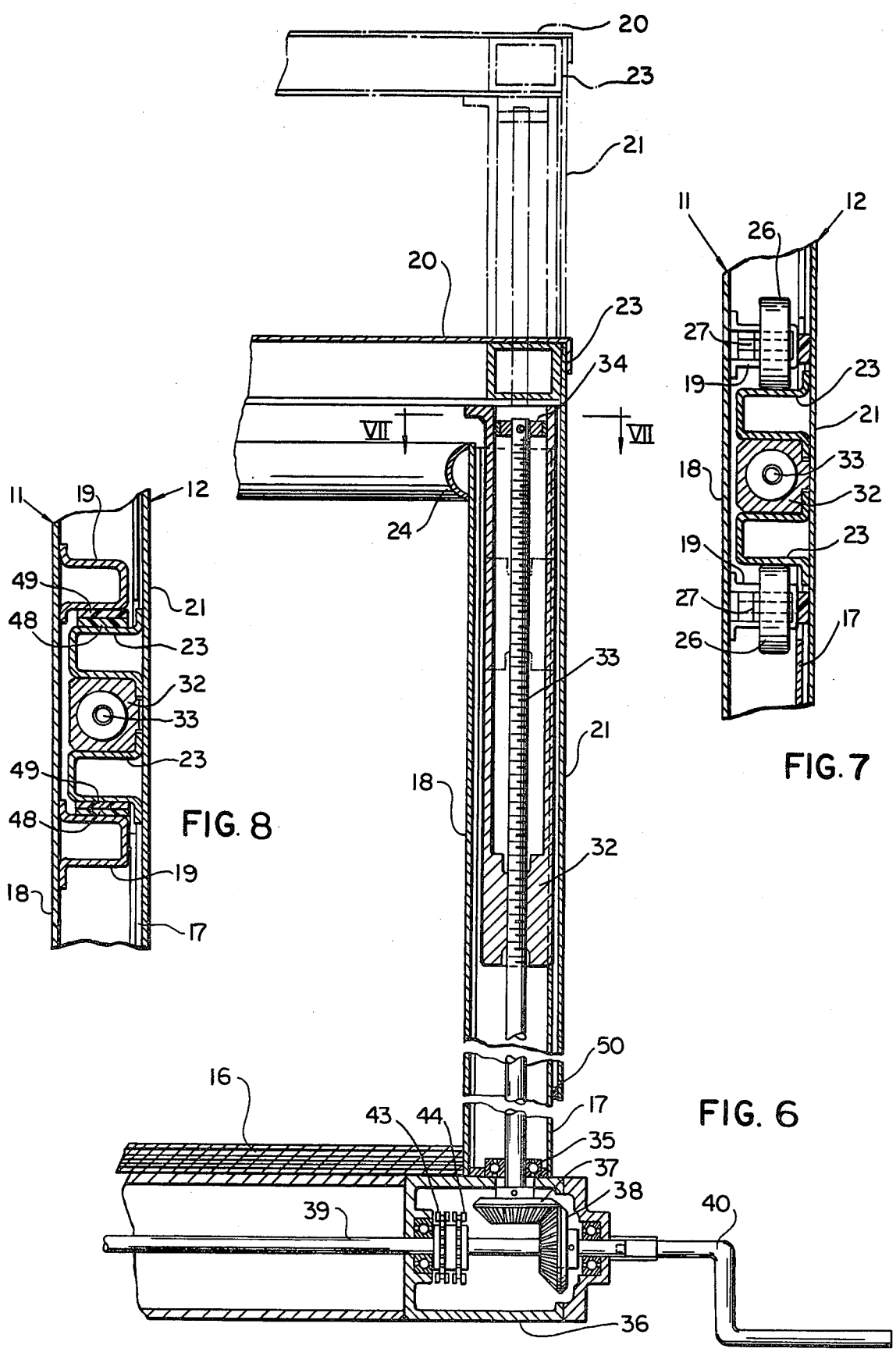

EXPANSIBLE AND RETRACTABLE VEHICLE BODY

BACKGROUND OF THE INVENTION

1. Field of the Invention

This invention relates to the art of expanding and contracting vehicle bodies to accommodate road conditions and provide maximum cargo space. Specifically, the invention deals with a closed truck trailer having a top body or roof portion which is easily raised and lowered to vary the overall height of the trailer.

2. Prior Art

Numerous types of vehicle bodies with roof sections adapted to be raised or lowered are known in the art, as for example, in the following U.S. Pat. Nos.:

| Inventor | Patent No. | Issue Date |
|---|---|---|
| Huptli | 2,797,124 | June 25, 1957 |
| Harrison et al | 3,286,414 | Nov. 22, 1966 |
| Young | 3,519,306 | July 7, 1970 |
| Schmidt | 3,622,193 | Nov. 23, 1971 |
| Steury | 3,674,305 | July 4, 1972 |
| Linville | 3,694,024 | Sept. 26, 1972 |
| Parent | 4,103,958 | Aug. 1, 1978 |
| Friedenberg | 4,206,943 | June 10, 1980 |

These known constructions, however, require collapsible or flexible sidewalled roof sections which cannot be shifted without excessive friction, and do not afford access doors or tailgates which will completely open and completely close the doorway regardless of the adjusted height of the trailer. It would, therefore, be an improvement in the art to provide rigid, weather resistant truck trailer bodies which are easily expanded or retracted to afford maximum cargo space for a designated route and which provide maximum access to the cargo space regardless of its adjusted condition.

SUMMARY OF THE INVENTION

According to this invention, a road vehicle such as a truck trailer is formed with rigid telescoped top and bottom box-like body portions defining a completely closed cargo space with a full height access opening closed by a door which will operate under all adjusted height positions of the top body portion. The body portions have structural reinforcing ribs or frame members which provide guides or tracks facilitating the raising and lowering of the top body portion. The top and bottom portions preferably have outer skins and inner liners with the ribs therebetween, and lifting jacks, such as screw rods, are preferably provided in the space between the outer skin and inner liner. Anti-friction rollers can be provided to rid on the ribs to facilitate raising and lowering of the top or roof body portion. The lifting jacks can be controlled from a single source such as a crank. The bottom body portion provides the major cargo space and rises to a height which will clear the lowest overpass or viaduct along a roadway while the top or roof body can extend this height for 1½, for example, to increase the cargo space on those routes where only higher overpasses and viaducts are encountered. As an example, the vehicle body may have a collapsed height of only about 12 feet and expanded height of about 13 feet 3 inches, although dimensions may be varied widely depending upon intended usage for the vehicle.

A preferred embodiment of the invention is shown in the attached three sheets of drawings, in which:

BRIEF DESCRIPTION OF THE DRAWINGS

FIG. 3 is a broken horizontal sectional view across the upper portion of the vehicle body.

FIG. 4 is an enlarged fragmentary view of a portion of the cargo door and track of the vehicle.

FIG. 5 is a transverse fragmentary sectional view along the line V—V of FIG. 4.

FIG. 6 is an enlarged fragmentary broken sectional view through one of the lifting jack areas of the vehicle.

FIG. 7 is a fragmentary horizontal sectional view along the line VII—VII of FIG. 6.

FIG. 8 is a view similar to FIG. 7 but showing a modified guide arrangement.

DESCRIPTION OF THE PREFERRED EMBODIMENTS

Figure 1:
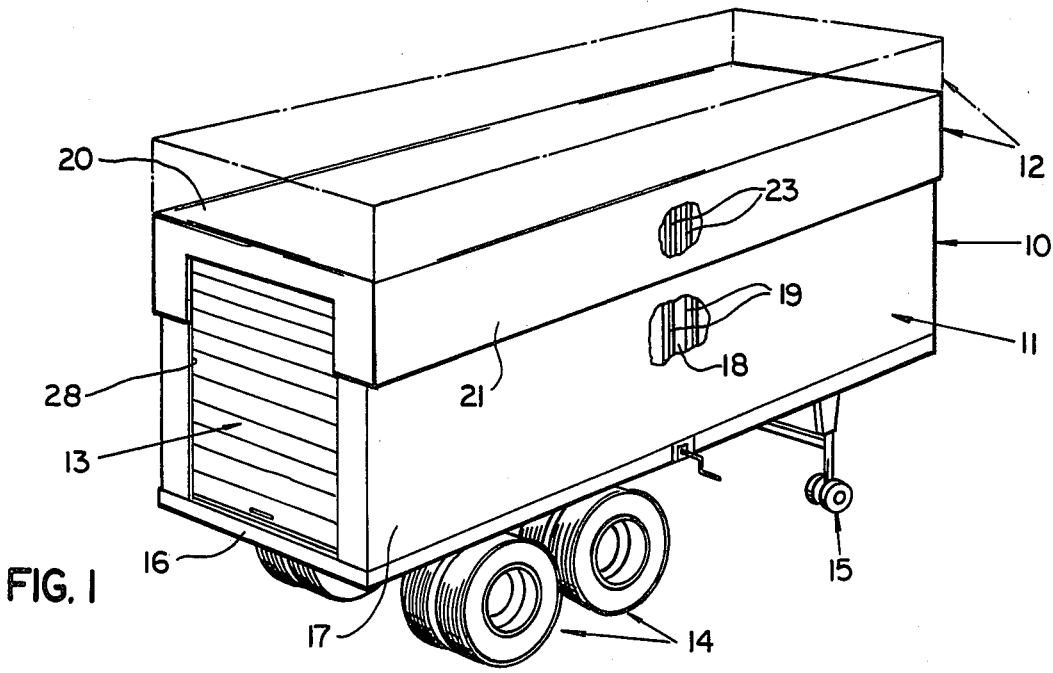
FIG. 1 is an isometric view of the exterior of a vehicle trailer according to this invention showing its expanded condition in dotted lines.

In FIG. 1, the reference numeral 10 designates generally a closed truck cargo trailer with rigid side walls and roof. The trailer 10 has a main rectangular bottom body 11, a roof or hood 12 telescoped over the top of the body 11 and adapted to be raised to the dotted line position, a vertical lift rear door 13, conventional rear wheels 14 supporting the rear end of the trailer 10 and a conventional dolly jack 15 supporting the front end of the trailer when it is uncoupled from the tractor.

The main body 11 has a conventional floor base 16, upright outer walls 17 around the perimeter of the base 16, an inner line 18, and upright ribs 19 between the outer wall 17 and the liner 18 secured to the base 16 to provide a rigid frame.

The upper body 12 has a rigid flat roof 20 and a depending peripheral wall or skirt 21 telescoped over the body 11. A peripheral box beam 23 at the junction of the roof 20 and depending side wall 21 rigidifies the body 12 as shown in FIG. 6. Likewise, an interior peripheral beam 24 is provided at the top of the body 11 inside of the rib supported liner 18 to form a top band support for the ribs 19 and liner 18. The top body 12, like the bottom body 11 has upright reinforcing ribs 25 secured to the depending peripheral portion 21 and the box beam 23.

Some of the ribs 19 are transversely slotted receiving rollers 26 through the slots and providing bearings 27 for these rollers. The roller carrying ribs 19 as shown in FIG. 7, are arranged to straddle a pair of adjacent ribs 25 of the top body 12 so that the ribs 25 will ride on the rollers 26. As shown in FIG. 3, each side of the vehicle has three sets of rollers 26 and ribs 25, the front end has two such sets and the back end has one set of rollers on each side of a doorway 28 for the door 13.

As shown in FIG. 5, the roller carrying rib 19 at each side of the doorway has an upright box beam 29 riding thereon. Each beam 29 supports a vertical track 30. The door 13 is composed of the usual hinged together panel sections, each with rollers 31 riding in the tracks 30.

A nut 32 is mounted between adjacent ribs 25 as shown in FIG. 7, and is slidably guided by these ribs as it is raised and lowered by a screw rod 33. The nut, as shown in FIG. 6, has a hollow upper portion, and the upper end of the rod 33 carries a bearing 34 which rides on the inner wall of this hollow nut to provide a guide for the rod.

The lower end of each rod 33 is mounted in bearings 35 and projects into a box beam 36 of the floor section 16 where it has a bevelled gear 37 secured thereon and meshing with a gear 38 of a cross rod 39.

Figure 2:
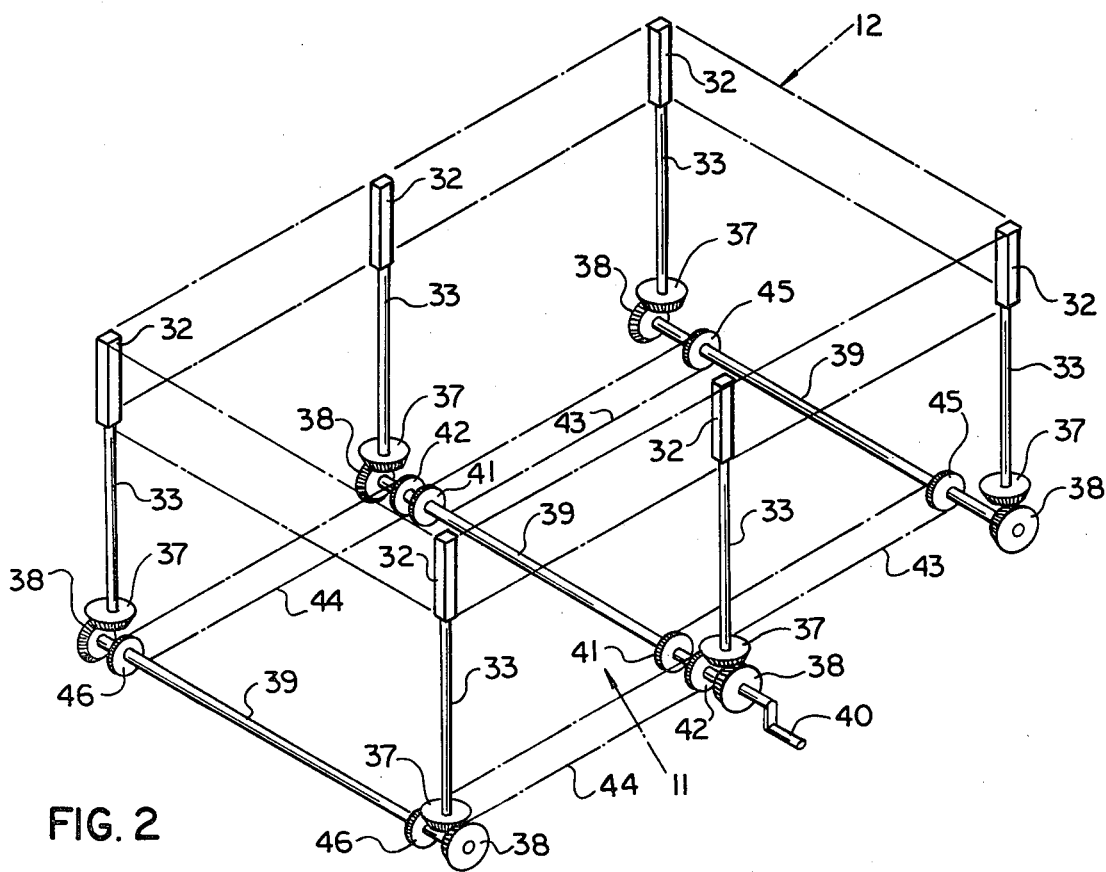
FIG. 2 is an isometric phantom view of the mechanism for raising and lowering the top body or roof section of the vehicle of FIG. 1.

The nute 22 are secured to and depend from the box beam 23 of the body 12. As shown in FIG. 2, six nut and rod assemblies 32 and 33 are provided respectively at the four corners of the vehicle body 10 and at the midportion of each side wall of the body. The assemblies are transversely aligned and the cross rods 39 connect the bevel gears 38 of the aligned assemblies. A crank 40 is detachably connected to the outer end of the central rod 39 and is manually rotated to drive the rod. Rotation of the central rod 39 in turn drives sprockets 41 and 42 mounted thereon and connected by chains 43 and 44 to sprockets 45 and 46 on the end rods 39. The sprocket and chain arrangement is duplicated on both sides of the vehicle body. Rotation of the crank 40 thus simultaneously drives all of the screw rods 33 to raise or lower the nuts 32 threaded thereon, thereby raising and lowering the body 12.

As shown in FIG. 4, the vertical track 30 on each side of the doorway has an open top into which is telescoped the vertical leg of an arcuate track 47 carried by the body portion 12 and having a horizontal leg underlying the roof of the body 12 to support the door 13 in its opened condition. Instead of providing rollers 26 on the ribs 19 of the main body 11 to ride on the adjacent ribs 23 of the top body 12, as shown in FIG. 8, anti-friction pads 48 and 49 can be secured respectively to the adjacent ribs 19 and 25 to ride thereon and provide a low friction guide for the raising and lowering of the top body 12.

From the above descriptions, it will therefore be understood that this invention provides a closed cargo carrying truck trailer with a telescoped top body portion that can be easily raised and lowered from a single station, such as a crank attached to a drive rod mounted under the main body portion of the vehicle. It will further be understood that the ribs or reenforcing struts of telescoped top and bottom body portions of the vehicle provide guide tracks which will maintain the telescoped bodies in aligned operating position and will facilitate raising and lowering of the top body portion. The lifting mechanisms are protected from the weather being mounted between the outer and inner skin of the body with cross-rods and gearing mounted in box frames or the like underlying the floor of the main body.

Since the top body telescopes over the bottom body, and since the lifting mechanisms operate to center the top body around the upper end of the bottom body, a sealing boot such as 50, shown in FIG. 6, can be provided on the inner face of the depending peripheral wall 21 of the body 12 to ride on the outer skin of the bottom body 11.

It will be apparent to those skilled in the art that many modifications and variations may be effected without departing from the spirit and scope of the novel concepts of the present invention.

I claim as my invention:

1. A closed cargo carrying expansible and contractable rigid vehicle body which comprises a main bottom body portion having upright side walls defining an open top and a rear doorway, a top roof body telescoped over said bottom body, vertical guides on the bottom and top telescoped body portions, mechanisms for raising and lowering the top body relative to the bottom body cooperating with said guides to vary the height of the body and doorway, a power input for said mechanisms, means connecting all of said mechanisms to said power input for simultaneous operation, a multi-panel overhead door closing said doorway and telescoped tracks on said bottom and top bodies supporting said panels for movement between a doorway closing upright position and a horizontal overhead doorway opening position throughout the varied height of the doorway.

2. A closed rigid cargo vehicle which comprises a wheeled main vehicle body with upright side walls defining an open top cargo chamber, a roof body telescoped on said main body, upright ribs on said main body, upright ribs on said top body in straddled relation with the ribs on the main body, said straddled ribs providing guide tracks for guiding the top body to an extended raised position and a retracted lower position, lift rod mechanisms for raising and lowering the top body, means for simultaneously driving said mechanisms, anti-friction means carried by adjacent straddled ribs to facilitate raising and lowering of the top body by said mechanisms, an overhead door closing a rear doorway, and telescoped door guiding tracks on said top and main bodies whereby said door will close the entire door way regardless of variations in the height thereof caused by the raising and lowering of said top body.

3. An expansible and contractable trailer body which comprises a lower main body with a bottom floor, upright side and front end walls, a rear doorway and an open top, a roof top body telescoped over the open top of the lower body, means raising and lowering said top body on said lower body, an overhead door closing said doorway, and telescoped door guiding tracks on said top and lower bodies whereby said door will close the entire doorway regardless of variations in the height thereof caused by the raising and lowering of said top body.

4. The vehicle body of claim 1 including vertical screw rods supported by the bottom body, nuts supported by the top body threaded thereon and cooperating guides on the bottom and top bodies facilitating raising and lowering of the top body by said screw rods and nuts.

5. The vehicle body of claim 1, wherein the upright side walls of the bottom body have spaced outer skins and inner liners with upright reinforcing ribs therebetween and the top body has side walls with ribs projecting through slots in the outer skin, said ribs of the bottom and top bodies being arranged in straddled relation to guide the top body and said mechanisms for raising and lowering the top body being positioned between straddled pairs of said ribs.

6. The vehicle body of claim 1, wherein the upright side walls of the bottom body have an outer skin and an inner liner space therefrom, and the mechanisms for raising and lowering the top body project between the outer skins and inner liners.

7. The vehicle body of claim 1, wherein the means connecting all of the mechanisms to the power input include sprockets and chains.

8. The vehicle body of claim 1, wherein the telescoped tracks include upright track sections mounted on the bottom body and arcuate track sections mounted on the top body with horizontal portions underlying the roof and vertical portions telescoped into the tracks on the bottom body.

9. The cargo vehicle of claim 2, wherein the lift rod mechanisms are positioned adjacent the pairs of straddled ribs.

10. The cargo vehicle of claim 2 including a crank for driving said lift rod mechanisms and sprockets and chains connecting said crank with all of said mechanisms.

11. The cargo vehicle of claim 2, wherein the antifriction means are rollers rotatably mounted on some of the ribs and riding on adjacent straddled ribs.

12. The cargo vehicle of claim 2, wherein the antifriction means include low-friction pads mounted on adjacent straddled ribs to slide thereon.

13. The trailer body of claim 3, wherein the door has a plurality of panels with rollers thereon riding in said tracks.

14. The trailer body of claim 3, wherein the lower and top bodies are in sealed relation.

15. The trailer body of claim 3, wherein the means for raising and lowering the top body and the lower body include nuts depending from the top body, upright screw rods carried by the lower body threaded through said nuts, and a crank actuated mechanism for simultaneously rotating all of the screw rods.

* * * * *